Jan. 14, 1958  J. W. CAUFFMAN  2,819,868
BALL VALVE HAVING ADJUSTABLE SEAT UNIT
Filed March 12, 1956  2 Sheets-Sheet 1
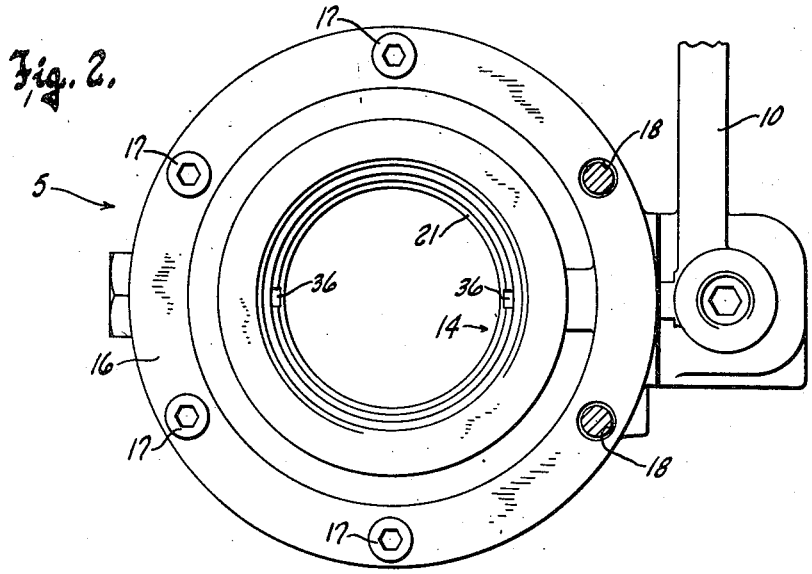
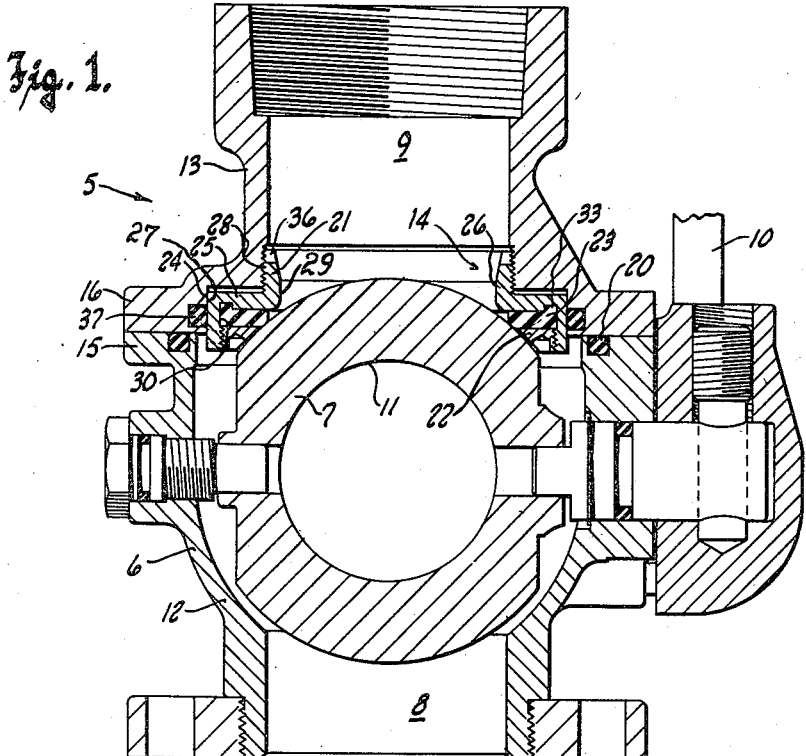
Inventor
John W. Cauffman
By [signature]
Attorney Jan. 14, 1958     J. W. CAUFFMAN     2,819,868
BALL VALVE HAVING ADJUSTABLE SEAT UNIT
Filed March 12, 1956     2 Sheets-Sheet 2
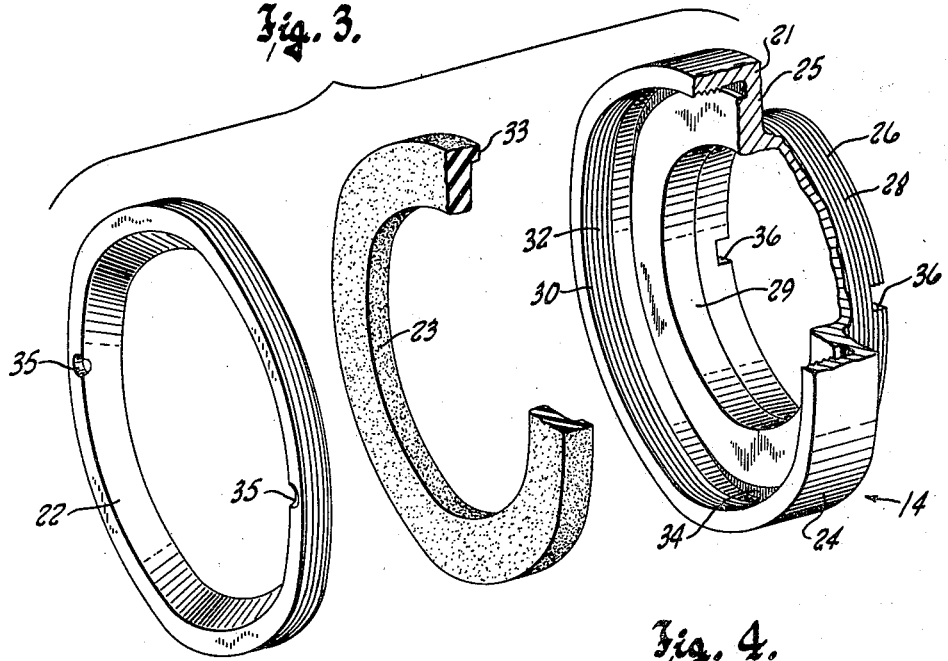
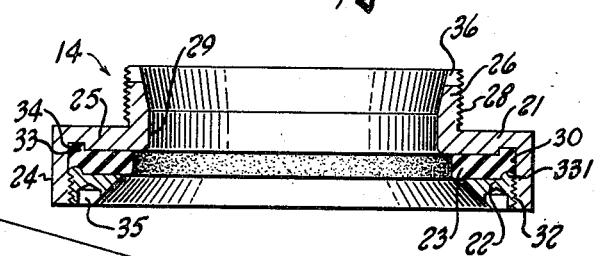
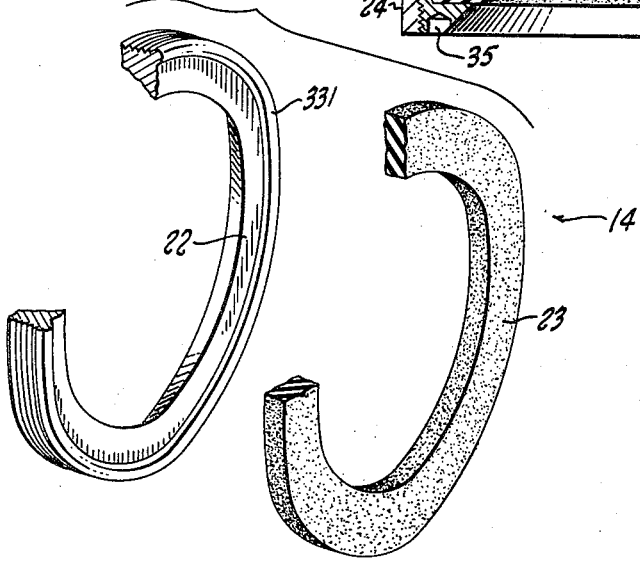
Inventor
John W. Cauffman United States Patent Office 2,819,868
Patented Jan. 14, 1958

2,819,868

BALL VALVE HAVING ADJUSTABLE SEAT UNIT

John W. Cauffman, Elkhart, Ind., assignor to Elkhart Brass Manufacturing Company, Inc., Elkhart, Ind., a corporation of Indiana Application March 12, 1956, Serial No. 570,985

2 Claims. (Cl. 251—315)

This invention relates to ball valves and refers more particularly to a seat unit for a valve of the type wherein the flow of fluid between axially aligned inlet and outlet passages in the valve body is controlled by a rotatable ball type valve element between the passages, communication between said passages being afforded by rotation of the ball element to a position in which a hole therethrough is aligned with the passages.

It is an object of the present invention to provide a seat unit for a ball type valve of the character described wherein the valve element seats against a resilient washer, so that perfect sealing of the valve in its closed position is not dependent upon precise finish of relatively movable metal parts, and wherein the seat unit is both readily adjustable and readily replaceable.

Another object of this invention is to provide a seat unit for a ball type valve of the character described wherein the seal between the ball valve element and the valve body is provided by a resilient washer which is readily replaceable and is mounted in the body for axial adjustment toward and from the ball valve element, to thus provide for maintenance of good sealing engagement between the ball element and the washer despite wear on the washer.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of physical embodiments of the invention constructed according to the best modes so far devised for the practical application of the principles thereof, and in which:

Figure 1 is a vertical sectional view through a ball type valve embodying the principles of this invention;

Figure 2 is a plan view of the valve shown in Figure 1;

Figure 3 is a disassembled perspective view of the seating unit of the valve shown in Figures 1 and 2 with portions broken away and shown in section;

Figure 4 is a longitudinal sectional view of a modified embodiment of the seating unit of this invention; and Figure 5 is a disassembled perspective view of the resilient washer and retaining ring of another modified form of the seating unit, portions being broken away and shown in section.

Referring now more particularly to the accompanying drawings, in which like numerals designate like parts throughout the several views, the numeral 5 designates generally a ball type valve embodying the principles of the present invention and comprising, in general, a valve body 6 having rotatably mounted therein a ball valve element 7 which controls communication between coaxial inlet and outlet passages 8 and 9, respectively, in the body. As is well known, the ball is rotatable, by means of a handle 10 connected therewith and accessible at the exterior of the valve body, to and from a valve open position in which a hole 11 in the ball is aligned with the passages 8 and 9 in the body, the rotational axis of the ball being transverse to the axis of the passages and to that of the hole 11 through the ball.

The body comprises a lower main section 12 which defines the inlet passage 8 and in which the ball is mounted, and an upper bonnet section 13 which defines the outlet passage 9 and in which the seating unit 14 of this invention is mounted as hereinafter more particularly described. These two sections of the body have mating flanges 15 and 16, and hold down bolts 17 project through loosely fitting holes 18 in the flange 16 of the bonnet into threaded holes in the flange 15 of the main body section to hold the two parts of the valve body assembled. The holes 18 in the bonnet flange are somewhat oversize to permit radial shifting of the bonnet relative to the main body section during assembly, thus enabling the seat unit to be accurately aligned with the ball. A resilient O-ring 20 confined in an annular groove in the face of one of the opposing flanges, serves as a gasket between the body sections.

The seating unit 14 comprises a carrier ring 21 and a retaining ring 22 which cooperates with the carrier ring to hold a resilient washer 23 in sealing engagement with the ball. The carrier ring comprises a cylindrical outer portion 24, a flange 25 extending radially inwardly from the cylindrical outer portion at one end thereof, and a neck 26 projecting from said flange at the side thereof remote from the cylindrical outer portion and concentric therewith. The bonnet section of the valve body has an internal thread near the inner end of the passage 9 and has a counterbore 27 to which the inner end of the passage 9 opens. The neck of the carrier ring is provided with an external thread, as at 28, which cooperates with the internal thread in the bonnet to mount the carrier ring in the bonnet, with the cylindrical outer portion of the carrier ring disposed in the counterbore 27. The neck and cylindrical outer portion of the carrier ring also define a bore 29 and a counterbore 30 therein, the bore forming a continuation of the passage 9 when the carrier ring is installed in the bonnet. The resilient washer 23 is flatwise confined against the flange 25 by the retaining ring. The axially outermost portion of the counterbore in the retaining ring is internally threaded as at 32 to receive the retaining ring, which has a corresponding external thread.

The washer 23 which effects the seal between the ball and the valve body is made of rubber, neoprene or similar resilient material and has a substantially rectangular cross section. If desired, it may be provided with an axially projecting circumferential ridge 33 at its outer marginal edge (see Figure 3) which engages in an axially opening groove 34 in the flange of the retaining ring, adjacent to the wall of the counterbore. The engagement of this ridge on the washer in the groove in the carrier ring prevents lateral displacement of the washer by the ball as the latter is moved back and forth relative to the washer with its surface in compressive engagement with the washer. The retaining ring may also be provided with an axially projecting circumferential ridge 331 around its periphery which compresses the ridge 33 on the washer into the groove 34 in the retaining ring, as shown in Figure 4; or, if the retaining ring is provided with the ridge 331 the ridge 33 on the resilient washer may be omitted and it may be made with a simple rectangular cross section, as shown in Figure 5, the ridge on the retaining ring being depended upon to deform the outer marginal edge portion of the washer into the groove 34.

The retaining ring has a frusto-conical inner surface and a substantially larger inside diameter than the washer so that the retaining ring clears the spherical surface of the ball and does not interfere with engagement of the washer by the ball. It will be observed that the spherical surface of the ball is engaged only by the lower inner edge of the washer, assuring that the ball will have sealing contact with the washer all the way around the washer.

The clamping force exerted upon the resilient washer by the retaining ring may be adjusted by changing the axial position of the retaining ring in the carrier ring; and to facilitate such adjustment, and also to facilitate removal and insertion of the resilient washer, the retaining ring is provided on its outer axial face with wells 35 adapted to receive the lugs of a spanner.

Similarly the threaded mounting of the carrier ring in the valve body enables axial adjustment of the seat unit relative to the ball, to thus compensate for wear on the washer and permit the same to be engaged with the ball under any desired sealing force. Removal and adjustment of the carrier ring is facilitated by spanner lug slots 36 at the axially outermost end of its neck.

To afford a seal between the carrier ring and the valve body at any position of axial adjustment of the carrier ring, an O-ring 37 is confined between the cylindrical outer portion 24 of the carrier ring and the valve body, in an annular groove in the bonnet.

From the foregoing description taken together with the accompanying drawings it will be readily apparent that this invention provides a seat unit for ball type valves wherein a perfect seal between the ball and the valve body is in no wise dependent upon precise machining of metal parts, and wherein the seal between the ball and the body, comprises a readily replaceable resilient washer which is mounted for axial adjustment toward and from the ball to enable adjustment of the seating unit to compensate for wear on the washer.

What is claimed as my invention is:

1. In a valve: a body provided with axially aligned inlet and outlet passages and having a valve chamber between said passages; a rotatable ball type valve element having a hole therethrough; means mounting the ball in the valve chamber for rotation about a fixed axis crosswise of the common axis of the inlet and outlet passages and with the hole in the ball registerable with said passages by rotation of the ball; a valve seat unit cooperable with the ball and comprising a carrier ring having a cylindrical outer portion, a flange joined to one end of the cylindrical outer portion and projecting inwardly therefrom, and a neck projecting axially from said flange at the side thereof remote from the cylindrical outer portion and concentric therewith, a resilient washer confined in said cylindrical outer portion, concentric therewith and flatwise seated on said flange, a retaining ring screw-threaded into the cylindrical outer portion of the carrier ring and engaged over said washer to hold the same clamped under pressure between it and the flange, said retaining ring having an inside diameter larger than that of the washer so that the inner edge of the washer is exposed; and means adjustably and removably securing the seat unit in the inner end portion of one of said valve passages with the inner edge of the washer in sealing engagement with the spherical surface of the ball, said means comprising a threaded connection between the neck of the retaining member and the inner end portion of the valve passage in which the retaining ring is located, and circumferentially spaced abutments on the neck accessible from the outer end of said valve passage so that the retaining ring may be turned to adjust the valve seat unit toward and from the ball, from outside the valve.

2. The structure of claim 1 further characterized by the provision of a seal between the retaining ring and the valve body which is effective in any position of adjustment of the valve seat unit, said seal comprising a counterbore in the valve body in which counterbore the cylindrical outer portion of the retaining ring is received, and an O-ring encircling the cylindrical outer portion of the retaining ring and confined between it and the adjacent wall of the counterbore.

References Cited in the file of this patent

UNITED STATES PATENTS

| | | |
|---|---|---|
| 676,526 | Anderson | June 18, 1901 |
| 1,973,418 | Sibley | Sept. 11, 1934 |
| 2,516,947 | Blevans | Aug. 1, 1950 |
| 2,529,412 | Parker | Nov. 7, 1950 |
| 2,628,809 | Mikeska | Feb. 17, 1953 |

FOREIGN PATENTS

| | | |
|---|---|---|
| 18,648 | Great Britain | Aug. 13, 1909 |
| 567,133 | Great Britain | Jan. 30, 1945 |